Dec. 5, 1972  MASUZO NAGAYAMA ET AL  3,705,192
METHOD OF PREPARING LIGHT-COLORED OLEFIN SULFONATE
Filed Aug. 11, 1970
APPARATUS FOR OLEFIN REFINING
AND SOLVENT RECOVERING
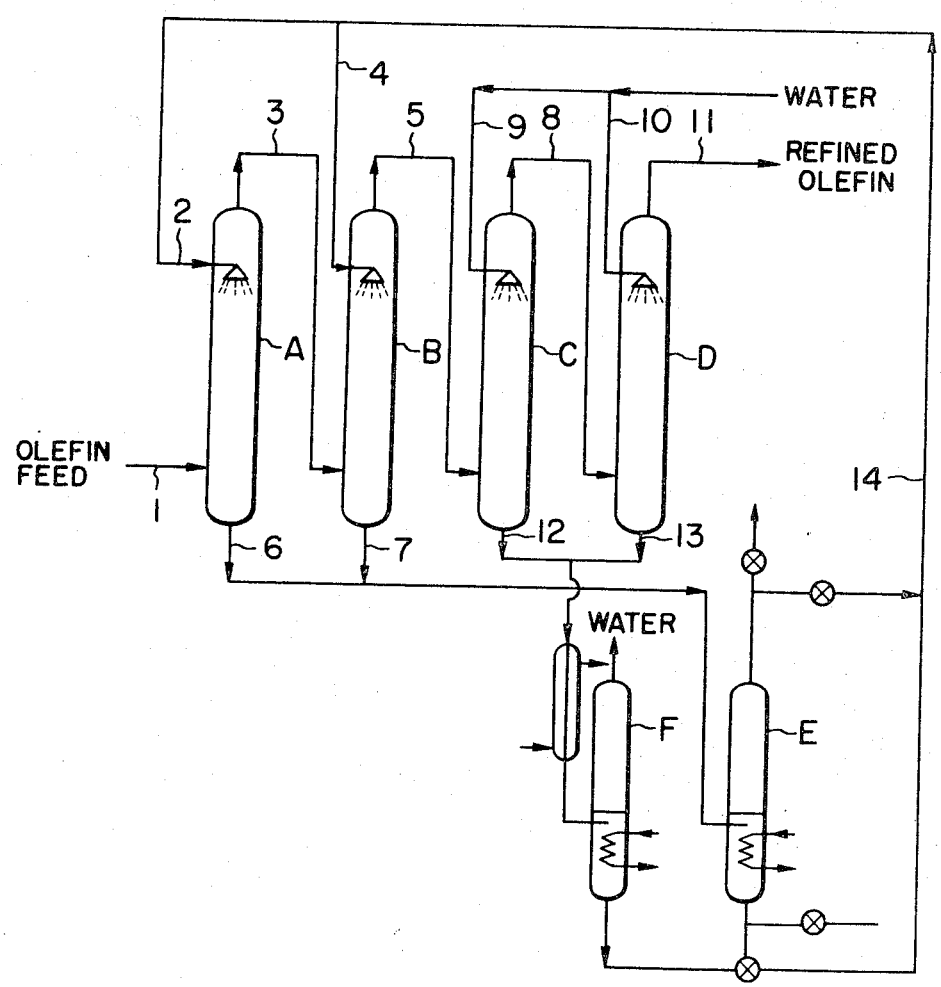
INVENTORS
MASUZO NAGAYAMA
BY HIROSHI OKADO
Woodhams, Blanchard & Flynn
ATTORNEYS

United States Patent Office 3,705,192
Patented Dec. 5, 1972

3,705,192
METHOD OF PREPARING LIGHT-COLORED OLEFIN SULFONATE
Masuzo Nagayama and Hiroshi Okada, Tokyo, Japan, assignors to Lion Fat & Oil Co., Ltd., Tokyo, Japan
Filed Aug. 11, 1970, Ser. No. 62,927
Claims priority, application Japan, Aug. 16, 1969, 44/64,923
Int. Cl. C07c *143/10, 143/16*
U.S. Cl. 260—513 R
4 Claims

ABSTRACT OF THE DISCLOSURE

A method of preparing a light-colored olefin sulfonate comprising the steps of: an olefin feed consisting essentially of straight-chain olefin, which has 10 to 22 carbon atoms, and containing such impurities as will cause the coloring of the sulfonation products thereof, is brought into contact with either a hydrogenated five-membered heterocyclic compound, wherein the hetero-atom is a nitrogen atom, said ring also having a carbonyl radical, or butyrolactone, or, if necessary, a mixture of water therewith, to extract and remove said impurities contained in the feed; the resultant refined olefin is sulfonated with sulfur trioxide gas, neutralized, and subsequently hydrolyzed.

BACKGROUND OF THE INVENTION

(a) Field of the invention

The present invention relates to a method of preparing a light-colored olefin sulfonate comprising the steps of: an olefin feed essentially consisting of straight-chain olefin having 10 to 22 carbon is brought into contact with a hydrogenated five-membered heterocyclic compound containing a nitrogen atom as the hetero-atom and having a carbonyl radical, or butyrolactone, or a mixture of water therewith, to extract and remove impurities contained in said feed; the resultant refined olefin is sulfonated with sulfur trioxide gas, neutralized, and subsequently hydrolyzed.

(b) Description of the prior art

The sulfonation of olefin with sulfur trioxide gas has generally been effected by continuously contacting olefin in the form of a thin film with sulfur trioxide gas to react with each other, and, subsequently, by neutralizing and hydrolyzing the reaction product, whereby olefin sulfonate is obtained. This sulfonate has various uses because of its efficiency as a surface active agent and particularly as a detergent, and has recently been utilized as a base of washing agents for domestic use.

A suitable olefin feed for use in preparing the foregoing olefin sulfonate includes one having a relatively high purity α-olefin obtained by thermal cracking of petroleum wax or by polymerization of ethylene in the presence of alkyl-aluminum catalyst and one obtained by concentration of a non-terminal olefin obtained by dehydrogenation of a straight-chain paraffin or by dehydrochlorination of a chlorinated paraffin or the like. The α-olefin obtained by polymerization of ethylene contains a small amount of impurities which cause coloring of olefin sulfonate, and the color of olefin sulfonate prepared therefrom is so slight as to require little consideration. On the contrary, the α-olefins obtained by thermal cracking of petroleum wax, concentration of non-terminal olefin and the like as set forth above contain much impurities. While such impurities cannot be fractionated by distillation because their boiling points are close to that of the olefins, sulfonation with sulfur trioxide gas of an olefin as containing these impurities results in a dark colored product which has too poor an appearance to use as it is. Therefore, it has been usual to subject the product to a decoloring t reatment by means of a decoloring agent, absorbent and the like, and such decoloring agent as hypochlorite is widely used for this purpose. However, inasmuch as the sulfur trioxide employed for said sulfonation is a strong reagent, the degree of coloring of the sulfonation product is too great to make it possible to decolor same satisfactorily by means of an absorbent or decoloring agent. Not only that, employment of the decoloring agent or the like in large quantities is accompanied by harmful after-effects such as acceleration of the decomposition and acidification of alkene sulfonate contained in the olefin sulfonate, and therefore, in the light of this fact too, an attempt to solve the problem of coloring by employing a large amount of any absorbent or decoloring agent is by no means advisable.

As means for obtaining a colorless olefin sulfonate, there have been several proposals up to date. For instance, Dutch patent application No. 6705918 has disclosed a method of pretreating the olefin feed by refining it with sulfuric acid, absorbent clay or the like. This method, however, not only is accompanied by such secondary reaction as isomerization of α-olefin therein, which α-olefin is most desirable in obtaining olefin sulfonate, into an inner olefin, but also is unsatisfactory in preventing coloring of the olefin sulfonate, so that it is also not feasible to prepare sulfonates having an excellent color-tone according to this method.

Another method of treating the olefin feed using a molecular sieve has been disclosed in Japanese patent publication No. 26,602/1967, but this method is also accompanied by undesirable secondary reactions such as isomerization or polymerization of olefin, and the coloring-prevention efficiency thereof is not satisfactory. There have also been proposed such methods as, for instance, treating olefin with aluminum oxide, but, under present conditions, none of these methods so far proposed is capable of achieving the object satisfactorily.

SUMMARY OF THE INVENTION

The object of the present invention is to provide a novel method of preparing olefin sulfonate which solves the foregoing various problems involved in the prior art thereby enhancing to utilities and improving the quality of the resultant olefin sulfonate.

The present invention provides a method of preparing a light-colored olefin sulfonate by the steps of contacting an olefin feed consisting essentially of straight-chain olefin with a hydrogenated five-membered heterocyclic compound containing a nitrogen atom as a hetero-atom and having a carbonyl radical, or butyrolactone, or a mixture of water therewith, to extract and remove the impurities contained in said feed, and the resultant refined olefin is subsequently contacted with sulfur trioxide gas, then neutralized and hydrolyzed.

A suitable olefin for use as a starting material in the method according to the present invention has a straight-chain of $C_{10-22}$ and includes the product obtained by cracking of petroleum wax. (Said cracking includes either thermal cracking or catalytic cracking.) Said petroleum wax can be obtained by dewaxing petroleum, and it does not matter whether a sweating or solvent deoiling treatment is carried out or not. In addition, a variety of olefins obtained by reforming petroleum, and non-terminal olefins obtained by dehydrogenation of straight-chain paraffins and dehydrochlorination of straight-chain chlorinated paraffins are also applicable as the starting material according to the method of the present invention. The inventors of the present invention, after their close examination of the components of these olefin feeds which cause the coloring of the sulfonate thereof, have discovered that most of these components are hydrocarbons as described in the following.

The components causing said coloring are not sulfur-containing compounds or nitrogen-containing compounds, or diolefins or branched-chain olefins, or vinylidene and trisubstituted olefins (these two substances are scarcely contained in the olefin obtained by cracking an ordinary petroleum wax and the olefin obtained by reforming petroleum), but they are the so-called cyclic olefins having 1–2 or more rings and possessing a branched or straight highly-unsaturated side chain and compounds having some polar radicals, and are generally mixtures of 50–200 compounds including isomers. The principal ones of said components are presumed to be derivatives of benzene type, naphthalene type, diphenyl ethylene type, diphenyl type, acenaphthene type and acenaphthylene type. Therefore, by using a refined olefin free of the foregoing components which cause said coloring, viz impurities, there can be obtained a light-colored olefin sulfonate. For the purpose of removing the variety of cyclic olefins as set forth above, various methods are conceivable, but the present inventors have found that, in order to carry out the refining most economically and efficiently, it is particularly suitable to use a hydrogenated five-membered heterocyclic compound containing a nitrogen hetero-atom and having carbonyl radical attached to the ring and, if necessary, containing water. Concrete examples of said hydrogenated heterocyclic compounds are 2-pyrrolidone, N-formyl-2-pyrrolidone, N-methyl-2-pyrrolidone, and mixtures thereof. According to the present invention, butyrolactone can also be used in lieu of the above compounds. These hydrogenated heterocyclic compounds and butyrolactone are solvents capable of selectively acting on the aforesaid impurities. (These compounds are hereinafter occasionally referred to as "solvent".) The art of employing a solvent of this kind in effecting separation of hydrocarbons such as paraffin and olefin is well known, but the art of separating selectively a small amount of cyclic olefinic co-existing in a large amount of straight chain olefin as in the present invention is unprecedented. In this connection, such solvents as sulforan, ethylene glycol, furfural, etc. which are well known to be effective in separating components of petroleum, are almost ineffective in achieving the object of the present invention.

Because the solvent applicable to the present invention is capable of acting very selectively, it has the advantage that a comparatively small-scale apparatus and particularly a small separation tower will suffice to achieve its object. In extracting impurities contained in the olefin feed by using the present solvent and such a small-scale apparatus, the amount of the solvent to be employed is determined according to the solubility of the cyclic olefins constituting the main component of said impurities to make sure that said cyclic olefins are completely dissolved thereby. The applicable ratio of the present solvent to the olefin feed by weight is usually in the range of from 1:10 to 20:1, and preferably is in the range of from 5:10 to 10:1.

BRIEF DESCRIPTION OF THE DRAWING

The figure is a schematic view of an apparatus for treating an olefin feed according to the invention.

Given in the following by reference to the accompanying drawing is an explanation of how to extract impurities from the olefin feed according to the method of the present invention. The olefin feed is introduced into the lower part of an extraction column A in a specified amount through a duct 1, while the solvent is fed into the upper part of the same extraction column A in a prescribed amount through a duct 2, to contact the olefin feed in counter current flow. Thus, the impurities contained in the olefin are extracted by the solvent within the extraction column A. The inside of the extraction column A may be equipped with column packings and disc contactors so as to accelerate more effectively the counter current extraction. An extraction column B, and washing towers C and D may also be respectively equipped with column packings and disc contactors therein for the same purpose. The olefin treated within the extraction column A is introduced into the lower part of the extraction column B by way of a duct 3, and subjected to extraction processing again in counter current flow with the solvent sent into the extraction column B through a duct 4 in the same way as in the case of the extraction column A. Subsequently, the treated olefin coming out from the extraction column B is sent into the lower part of the washing tower C through a duct 5. Meanwhile, the solvent accumulated in the lower part of the extraction columns A and B is sent to a separaation tower E through ducts 6 and 7. The olefin sent into the lower part of the washing tower C, which contains a small amount of the solvent, is subjected to washing by counter currently flowing water introduced into the upper part of the washing tower C through a duct 9. The olefin treated in the washing tower C is sent into the lower part of the washing tower D through a duct 8 and subjected to washing again by counter current flowing water introduced into said tower D through a duct 10, and thereafter taken out from the system as a refined olefin through a duct 11. This refined olefin, if necessary, is re-distilled. In other words, in case there exists in the refined olefin an excess amount, which is above the specified allowable amount, of the water and solvent so as to make the refined olefin unsuitable for use, these impurities may be fractionated by means of re-distillation from said olefin. As the used water accumulated in the lower part of the washing towers C and D contains some solvent, it is sent into a distillation tower F through ducts 12 and 13, wherein it is separated into water and solvent and the solvent thus obtained is sent through a duct 14 for reuse. Meanwhile, the solvent collected through the ducts 6 and 7 and containing impurities is separated into solvent and impurities within a distillation tower E, and the impurities thus separated are discharged to the outside of the system, while the separated solvent is circulated for reuse through the duct 14. In this connection, in case there is no difference between the boiling point of the solvent and that of the impurities or both boiling points are approximately the same, the impurities-containing solvent collected as above is rinsed with water to obtain an aqueous solution of said solvent, and, by removing the water content from said aqueous solution by using the distillation tower F, the solvent can be recovered for reuse.

The foregoing extraction process is usually conducted at a temperature in the range of −20–205° C., and preferably in the range of 0–100° C., but the optimum conditions depend on the kind of the olefin feed and the water content in the solvent. And, as for the pressure applicable to this process, it ranges from atmospheric pressure to 50 kg./cm.$^2$ and preferably from atmospheric pressure to 20 kg./cm.$^2$.

The washing process within the washing tower C and D is usually conducted at a temperature in the range of 1–100° C. and preferably in the range of 20–70° C.

When the refined olefin thus obtained is brought into continuous contact with sulfur trioxide gas—preferably sulfur trioxide gas diluted with an inert gas—in the form of a thin film, to thereby effect sulfonation, and thus sulfonated olefins is neutralized and subjected to hydrolysis by means of a proper amount of alkali, there is obtained a light-colored olefin sulfonate having an excellent surface activity.

The reason why the method of the present invention can provide a light-colored olefin sulfonate may be well understood from the foregoing description, and what is essential is about as follows. That is, the olefin feed is deprived of the cyclic olefins constituting the main component of the impurities contained therein through extraction by virtue of a specific solvent at the refining stage, and as a result, said olefin material is almost free from said impurities that may cause coloring at the sulfonation stage, i.e., a compound having an absorbent zone in its visible light spectrum.

The fact that the method according to the present invention is capable of producing an olefin sulfonate which is bleachable and less colored even when subjected to sulfonation by means of such a strong sulfonating agent as sulfur trioxide under comparatively severe reaction conditions—it is presumed that the olefin feed will undergo as high a temperature as 50–100° C. when subjected to catalytic reaction in the state of a thin film—is also attributable to the foregoing reason. In this context, although the sulfonation of the refined olefin can be effected by such method as described above, the method of the present invention is not limited to the foregoing sulfonation method; but it is preferable to employ such a method by bringing sulfur trioxide gas into contact with olefin in the state of a thin film so as to be capable of producing as much alkene monosulfonate and 1,3- or 1,4-sultone as possible. And, as to the hydrolysis, it suffices to apply conditions capable of hydrolyzing said sultones to convert them into water-soluble sulfonates.

DESCRIPTION OF THE PREFERRED EMBODIMENTS

Example 1

In this example, the extraction columns A and B such as described in the foregoing and filled with a packing material made of styrene and measuring 0.64 cm.$^2$ in area and 0.08 cm. in thickness were employed. Through the process comprising the steps of sending α-olefin having 15–18 carbon atoms and obtained through cracking of petroleum wax (said olefin having a mean molecular weight of 228 and consisting of 90% of α-olefin, 6% of diolefin, 0.4% of inner olefin, 1.5% of paraffin and 2.1% of cyclic olefin) into the lower part of the extraction column A at the rate of 500 ml. per hour while sending N-methyl-2-pyrrolidone containing 5% of water into the upper end of the same column at the rate of 1000 ml. per hour to effect counter current extraction within said tower at room temperature, subsequently effecting counter current extraction again within the extraction column B under the same conditions as in the column A, and rinsing the thus treated olefin with water within the aforementioned washing towers C and D, there was obtained refined α-olefin at a yield of 94.5%. Analysis of this refined olefin by gas-chromatography showed the cyclic olefin decreased to 0.2%. In this connection, the water content was 150 p.p.m., and this amount did not prove harmful to the subsequent sulfonation.

This refined α-olefin having 15–18 carbon atoms and a crude α-olefin having 15–18 carbon atoms were respectively sulfonated by means of a continuous thin-film sulfonation apparatus of a laboratory scale. This reaction apparatus was made of Pyrex glass and measured 5 mm. in diameter and 120 cm. on the length of the reactor, and was devised to cause the feed and the inert gas SO$_3$ to come into contact while flowing downwardly in parallel. The reaction conditions were as follows: the concentration of SO$_3$ to N$_2$ gas was 2.8 vol. percent; the mol ratio of SO$_3$ to the feed was 1.20; the contact time was 30–60 seconds; the rate of feeding the α-olefin feed was 6 ml. per minute; the feed temperature at the time of feeding was 25° C.; and the reaction temperature was 80° C.

The products from the sulfonation were hydrolyzed after neutralization with alkali, to thereby obtain sodium α-olefin sulfonate, respectively. This substance was possessed of such properties as shown in Table 1, which showed an increase in the yield of α-olefin sulfonate using the refined olefin and a remarkable improvement of the color tone. And, though it can be used as it is, application of oxidation bleaching (by means of sodium hypochlorite) can produce an olefin sulfonate having an extremely light-color.

TABLE 1

Properties of α-Olefin Sulfonate Having 15-18 Carbon Atoms

| Items | α-olefin Crude | α-olefin Refined |
|---|---|---|
| Unreacted oil content, percent (against AOS [1]) | 5.5 | 4.1 |
| Color tone of 5% aqueous solution of AOS-Na salt (Klett value [2]) | 830 | 300 |
| Post-bleaching color tone of 5% aqueous solution of AOS-Na salt (in case of applying 1% of sodium hypochlorite against AOS) | 250 | 50 |

[1] AOS is the abbreviation of α-olefin sulfonate. (The same applies hereinafter.)
[2] The value obtained by measuring with Klett-Summerson's photoelectric colorimeter (using a filter No. 42).

Example 2

In accordance with Example 1, and by employing the same extraction apparatus as that in Example 1 and through the process comprising the steps of sending α-olefin having 11–14 carbon atoms obtained by cracking petroleum wax (said olefin having a mean molecular weight of 176 and consisting of 87.3% of α-olefin, 6.8% of diolefin, 0.4% of non-terminal olefin, 2.0% of paraffin and 3.6% of cyclic olefin) into the lower part of the extraction column A at a rate of 500 ml. per hour while sending 2-pyrrolidone containing 2% of water into the upper part of the same column at a rate of 1000 ml. per hour to effect counter current extraction within said column at a temperature of 45° C., subsequently effecting extraction again within the extraction column B under the same conditions as in the extraction column A, and rinsing the thus treated olefin with water within the washing towers C and D, there was obtained refined α-olefin at a yield of 93.8%. Analysis of this refined olefin by gas-chromatography showed the amount of cyclic olefin decreased to 0.3%.

This refined α-olefin having 11–14 carbon atoms and a crude α-olefin having 11–14 carbon atoms were sulfonated under the same conditions by employing the same apparatus as described in Example 1, subjected to neutralization and hydrolysis in the same way, thereby producing sodium α-olefin sulfonate, respectively. This substance was possessed of such properties as shown in Table 2, which proves an increase in a yield of α-olefin sulfonate using the refined olefin and a remarkable improvement of the color tone.

TABLE 2

Properties of α-Olefin Sulfonate Having 11-14 Carbon Atoms

| Items | α-Olefin Crude | α-Olefin Refined |
|---|---|---|
| Unreacted oil content, precent (against AOS) | 6.5 | 4.7 |
| Color tone of 5% aqueous solution of AOS-Na salt (Klett value) | 900 | 300 |
| Post-bleaching color tone of 5% aqueous solution of of AOS-Na salt (in case of applying 1% of sodium hypochlorite against AOS) | 300 | 63 |

Example 3

In accordance with Example 1 and by employing the same extraction apparatus as that in Example 1, non-terminal straight-chain olefin having 14–17 carbon atoms obtained by concentrating a product from dehydrochlorination of a chlorinated straight-chain paraffin by using molecular sieve 13× and silica gel (said olefin having a mean molecular weight of 215 and consisting of 83.5% of non-terminal olefin, 3.0% of diolefin, 6.3% of terminal olefin, 4.5% of paraffin and 2.7% of cyclic olefin) was treated with N-formyl-2-pyrrolidone. In this case, however, the olefin was fed at a rate of 300 ml. per hour, N-formyl-2-pyrrolidone was fed at a rate of 1.5 l. per hour, and the temperature for treatment in the extraction columns A and B was 50° C. respectively. The yield of the refined non-terminal olefin subsequent to rinsing with water in the washing towers C and D was 93.8%, and an analysis of said refined olefin by gas-chromatography showed decrease of cyclic olefin to 0.3%.

This refined non-terminal olefin having 14–17 carbon atoms and a crude non-terminal olefin having 14–17 carbon atoms were sulfonated under the same conditions by employing the same apparatus as described in Example 1, provided that the mol ratio of $SO_3$ to the non-terminal olefin was 1.15. Subsequently, the products from the sulfonation were subjected to neutralization and hydrolysis in the same way as in Example 1, thereby producing sodium olefin sulfonate. This substance was possessed of such properties as shown in Table 3, which shows increase in a yield of α-olefin sulfonate and the drastic improvement of the color tone as compared with the crude olefin.

TABLE 3

Properties of Non-Terminal Olefin Sulfonate Having 14–1 Carbon Atoms

| Items | α-Olefin | |
|---|---|---|
| | Crude | Refined |
| Unreacted oil content, percent (against AOS) | 8.2 | 6.5 |
| Color tone of 5% aqueous solution of AOS-Na salt (Klett value) | 950 | 400 |
| Post-bleaching color tone of 5% aqueous solution of AOS-Na salt (in case of applying 1% of sodium hypochlorite against AOS) | 280 | 65 |

Example 4

In this example, the extraction columns A and B filled with a packing material made of styrene and measuring 2.54 cm.$^2$ in area and 0.04 cm. in thickness were used. Through the process comprising the steps of sending the same α-olefin as in Example 1 having 15–18 carbon atoms into the lower part of the extraction column A at a rate of 200 l. per hour while sending butyrolactone containing 4% of water into the upper part of the same column at the rate of 400 l. per hour to effect counter current extraction within said column at room temperature, subsequently effecting counter current extraction again within the extraction column B under the same conditions as in the column A, and rinsing the thus treated olefin with water within the washing towers C and D, there was obtained a refined α-olefin at a yield of 95%.

Analysis of this refined olefin by gas-chromatography showed a decrease of cyclic olefin to 0.2%. In this connection, the water content was 145 p.p.m., and the product contained a trace of N-methyl-2-pyrrolidone.

This refined α-olefin having 15–18 carbon atoms and a crude α-olefin having 15–18 carbon atoms were respectively subjected to sulfonation by using an industrial scale sulfonation apparatus disclosed in Japanese patent publication No. 252/1967 and sulfur trioxide diluted with dry air (the mol ratio of $SO_3$ to the feed was 1.15) at a reaction temperature of 60° C., whereby there was obtained a sulfonated product at a rate of 1200 kg. per hour, respectively. The contact time in this case was 5 minutes. Subsequently, the thus reacted substance was neutralized with a 10% aqueous solution of NaOH to the extent of 0.95 mol equivalent of $SO_3$ introduced at the time of sulfonation reaction and subjected to hydrolysis at a temperature of 160° C. for 20 minutes. The properties of the respective products thus obtained were as shown in Table 4, which shows an increase in the yield of α-olefin sulfonate and a drastic improvement of the color tone for the product made from the refined olefin.

TABLE 4

Properties of α-Olefin Sulfonate Having 15–18 Carbon Atoms Prepared in Industrial Scale

| Items | α-olefin | |
|---|---|---|
| | Crude | Refined |
| Unreacted oil content, percent (against AOS) | 4.8 | 3.3 |
| Color tone of 5% aqueous solution of AOS-Na salt (Klett value) | 790 | 280 |
| Post-bleaching color tone of 5% aqueous solution of AOS-Na salt (in case of applying 1% of sodium hypochlorite against AOS) | 210 | 45 |

What we claim is:

1. In a method for preparing a light-colored olefin sulfonate, the improvement which comprises:
   (1) contacting
      (a) an olefin feed consisting essentially of straight-chain olefin having from 10 to 22 carbon atoms and containing impurities which will cause coloring of sulfonation products thereof, with
      (b) a material selected from the group consisting of 2-pyrrolidone, N-formyl-2-pyrrolidone, N-methyl-2-pyrrolidone and mixtures thereof, and butyrolactone, or a mixture of said material with water,
   at a temperature in the range of from −20° C. to 205° C., at a pressure in the range of from atmospheric pressure to 50 kg./cm.$^2$, and at a ratio of (b):(a) in the range of from 1:10 to 20:1 parts by weight,
   to extract and remove impurities from the olefin feed whereby to obtain a refined olefin;
   (2) sulfonating the refined olefin with sulfur trioxide gas and then neutralizing and hydrolyzing the sulfonated olefin.

2. A method according to claim 1, in which said olefin feed (a) flows counter-currently to the flow of said material (b).

3. A method according to claim 1, in which said refined olefin is rinsed with water at a temperature in the range of from 1° C. to 100° C., prior to sulfonating the refined olefin.

4. A method according to claim 1, in which the ratio of (b):(a) is in the range of from 5:10 to 10:1 parts by weight.

References Cited

UNITED STATES PATENTS 3,492,343    1/1970    Garner et al. _____ 260—513 R

DANIEL D. HORWITZ, Primary Examiner

U.S. Cl. X.R.

260—677 A